(12) United States Patent
Zanni

(10) Patent No.: US 11,660,683 B2
(45) Date of Patent: May 30, 2023

(54) DEVICE FOR RESTRAINING/LOCKING MECHANICAL PARTS ON MACHINE TOOLS

(71) Applicant: Hydroblock S.r.l., Reggio Emilia (IT)

(72) Inventor: Davide Zanni, Reggio Emilia (IT)

(73) Assignee: Hydroblock S.r.l., Reggio Emilia (IT)

( * ) Notice: Subject to any disclaimer, the term of this patent is extended or adjusted under 35 U.S.C. 154(b) by 176 days.

(21) Appl. No.: 17/276,214

(22) PCT Filed: Sep. 13, 2019

(86) PCT No.: PCT/IB2019/057739
§ 371 (c)(1),
(2) Date: Mar. 15, 2021

(87) PCT Pub. No.: WO2020/053829
PCT Pub. Date: Mar. 19, 2020

(65) Prior Publication Data
US 2022/0023958 A1    Jan. 27, 2022

(30) Foreign Application Priority Data

Sep. 14, 2018  (IT) .................. 102018000008602

(51) Int. Cl.
*B23B 31/40*    (2006.01)
*B25B 5/08*     (2006.01)

(52) U.S. Cl.
CPC .......... *B23B 31/4053* (2013.01); *B25B 5/087* (2013.01); *Y10T 279/1033* (2015.01)

(58) Field of Classification Search
CPC . B23B 31/404; B23B 31/4053; B23B 31/406; B25B 5/087; Y10T 279/1033
See application file for complete search history.

(56) References Cited

U.S. PATENT DOCUMENTS 7,303,186 B2 * 12/2007 Yonezawa ................ F16M 7/00
                                                           269/309
10,632,593 B2 *  4/2020 Zanni ..................... B23Q 3/068
2017/0304907 A1 * 10/2017 Ziegelmeyer ......... B23B 31/402

FOREIGN PATENT DOCUMENTS

WO     WO-2017130132 A1 *  8/2017  ............ B23Q 3/068

* cited by examiner

*Primary Examiner* — Eric A. Gates

(57) ABSTRACT

The device (1) for restraining/locking mechanical parts on machines tools comprises:
  a hydraulic cylinder (2);
  a first piston (9) comprising a head (10) which projects from the hydraulic cylinder (2), the first piston (9) being slidable along a main line (B1);
  at least two self-centring locking elements (19) joined to the head (10) in such a way that they are movable along lines of sliding (B2) which are substantially transversal to the main line (B1); and
  movement means (21, 22) for moving the self-centring locking elements (19) between a retracted position and an extracted position, wherein the movement means (21, 22) comprise:
    a hydraulic chamber (21) made in the first piston (9);
    a second piston (22) which is slidable along the main line (B1) between a starting position and an arrival position and which comprises an operating portion (23) joined to the self-centring locking elements (19).

12 Claims, 5 Drawing Sheets

DEVICE FOR RESTRAINING/LOCKING MECHANICAL PARTS ON MACHINE TOOLS

RELATED APPLICATIONS

This application is a National Phase of PCT Patent Application No. PCT/IB2019/057739 having International filing date of Sep. 13, 2019, which claims the benefit of priority of Italian Patent Application No. 102018000008602 filed on Sep. 14, 2018. The contents of the above applications are all incorporated by reference as if fully set forth herein in their entirety.

FIELD AND BACKGROUND OF THE INVENTION

The present invention relates to a device for restraining/locking mechanical parts on machine tools.

Machining operations carried out on mechanical parts require a stable locking of the workpieces themselves in order to avoid machining deformation and/or defects, especially when rather high precision is required and the tools used (e.g. diamond cutting discs) can risk breaking.

In this regard, it is well known to restrain a raw mechanical part onto a first station to perform a certain number of machining operations; then the workpiece is removed from the first station, restrained onto a second station, locked at different points and finally subjected to the missing machining operations.

The passage through two work stations is often mandatory, since it is not possible to perform mechanical machining in the proximity of the workpiece locking points when, in the first station, the workpiece is still in the raw condition.

Therefore, the second station is intended to perform machining operations at the workpiece locking points used in the first station, gripping the workpiece at different points and sufficiently distant from each other.

The sequence of operations just described is particularly common for high performance mechanical parts, e.g. for the aeronautical and automotive sectors, and for parts provided with holes requiring subsequent machining, wherein the holes are machined in a first station and subsequent machining is completed in a second station.

An example of mechanical parts that need to be machined in two different stations consists of metal structures provided with a hose clamp; the hose clamp, in practice, consists of a ring element with a central hole and a side cut that allows the ring element to be enlarged and tightened around a hose, a bar, or another member.

In the first station the mechanical part is machined to drill and/or finish the central hole of the ring element, while in the second station the side cut is made by means of a cutting disc.

For this purpose, the second station is provided with a centring element applied inside the hole machined in the first station; the centring element allows the ring element to be blocked and prevents the vibrations of the ring element generated during cutting from damaging the cutting disc or, when the clamp is detached, from closing on itself and breaking the tool.

This prior art, however, has some drawbacks, including the fact that using two different stations to machine a single piece involves high costs and long lead times, thus requiring numerous and inconvenient machine stops to dismantle parts from one station and restrain them onto another one.

A further drawback of this prior art is the fact that the precision achievable for mechanical machining is limited by the need to use two work stations; on the second station, in fact, a second workpiece must be restrained, with the risk of placing the workpiece in a position that is not perfectly aligned with the machine tool's reference system and therefore of performing inaccurate machining.

Another drawback is that, since the second station has to grasp the workpiece at different points with respect to the first station, the workpiece then needs additional gripping surfaces, which require dedicated and particularly precise machining that increases the total number of operations to be performed, with consequences on the time taken and on tool wear.

SUMMARY OF THE INVENTION

The main aim of the present invention is to devise a device for restraining/locking mechanical parts on machine tools that allows mechanical machining to be carried out on a workpiece by means of a single work station and a single restraint.

Within the illustrated aim, one of the objects of the present invention is to allow a reduction in the cost of machining compared to known restraining/locking devices.

Another object of the present invention is to reduce the cost and time required to perform machining on mechanical parts.

A further object of the present invention is to improve the achievable precision for mechanical machining.

Yet another object of the present invention is to reduce the number of machining operations, particularly to eliminate the additional operations required to create the gripping surfaces of a workpiece.

Another object of the present invention is to devise a device for restraining/locking mechanical parts on machine tools that allows overcoming the aforementioned drawbacks of the prior art in a simple, rational, easy, effective to use and low cost solution.

The aforementioned objects are achieved by the present device for restraining/locking mechanical parts on machine tools according to claim 1.

BRIEF DESCRIPTION OF THE SEVERAL VIEWS OF THE DRAWINGS

Other characteristics and advantages of the present invention will become more evident from the description of a preferred but not exclusive embodiment of a device for restraining/locking mechanical parts on machine tools, illustrated by way of an indicative yet non-limiting example in the accompanying tables of drawings in which.

DESCRIPTION OF SPECIFIC EMBODIMENTS OF THE INVENTION

Figure 1:
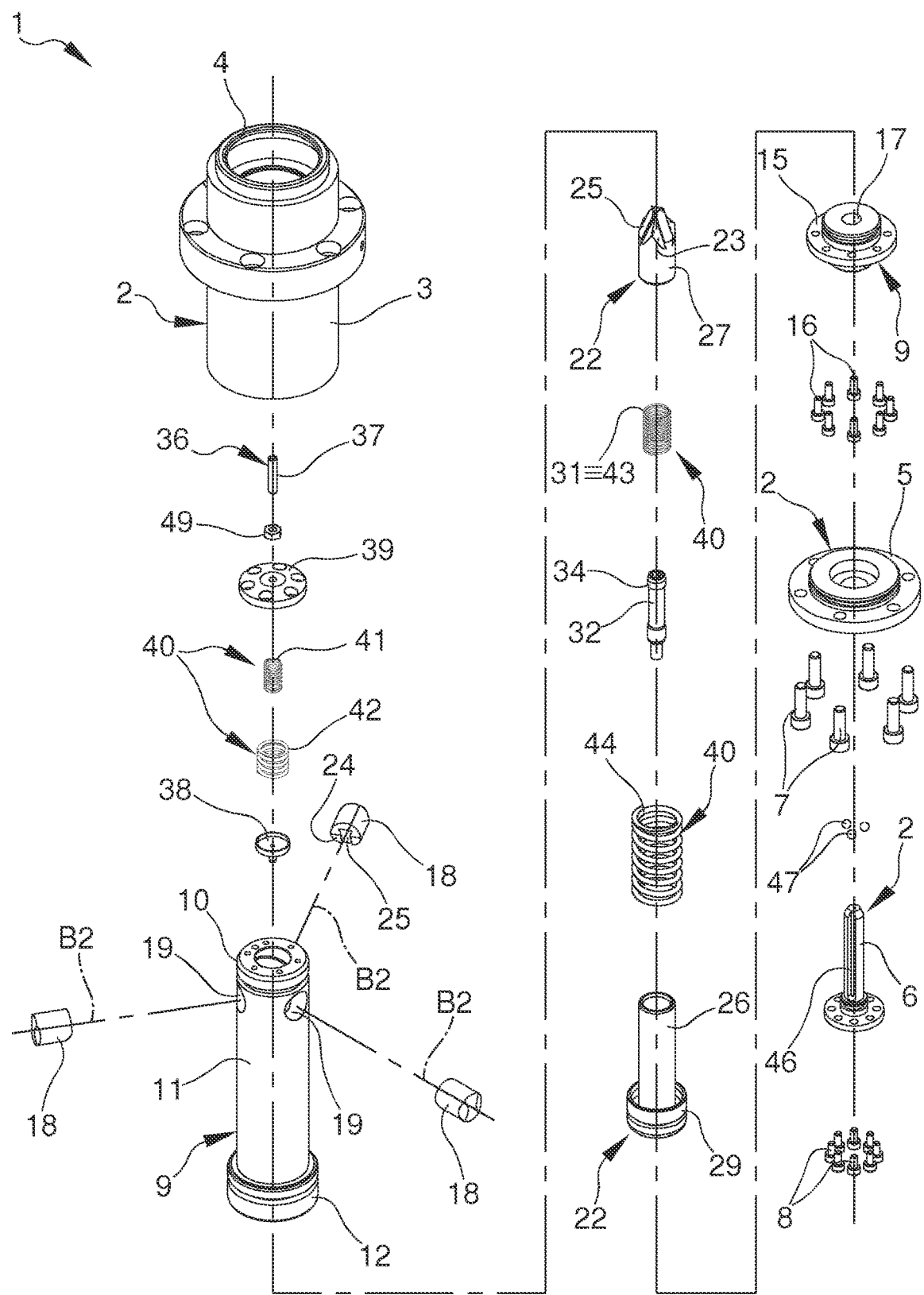
FIG. 1 is an exploded view of the device according to the invention.
Figure 2:
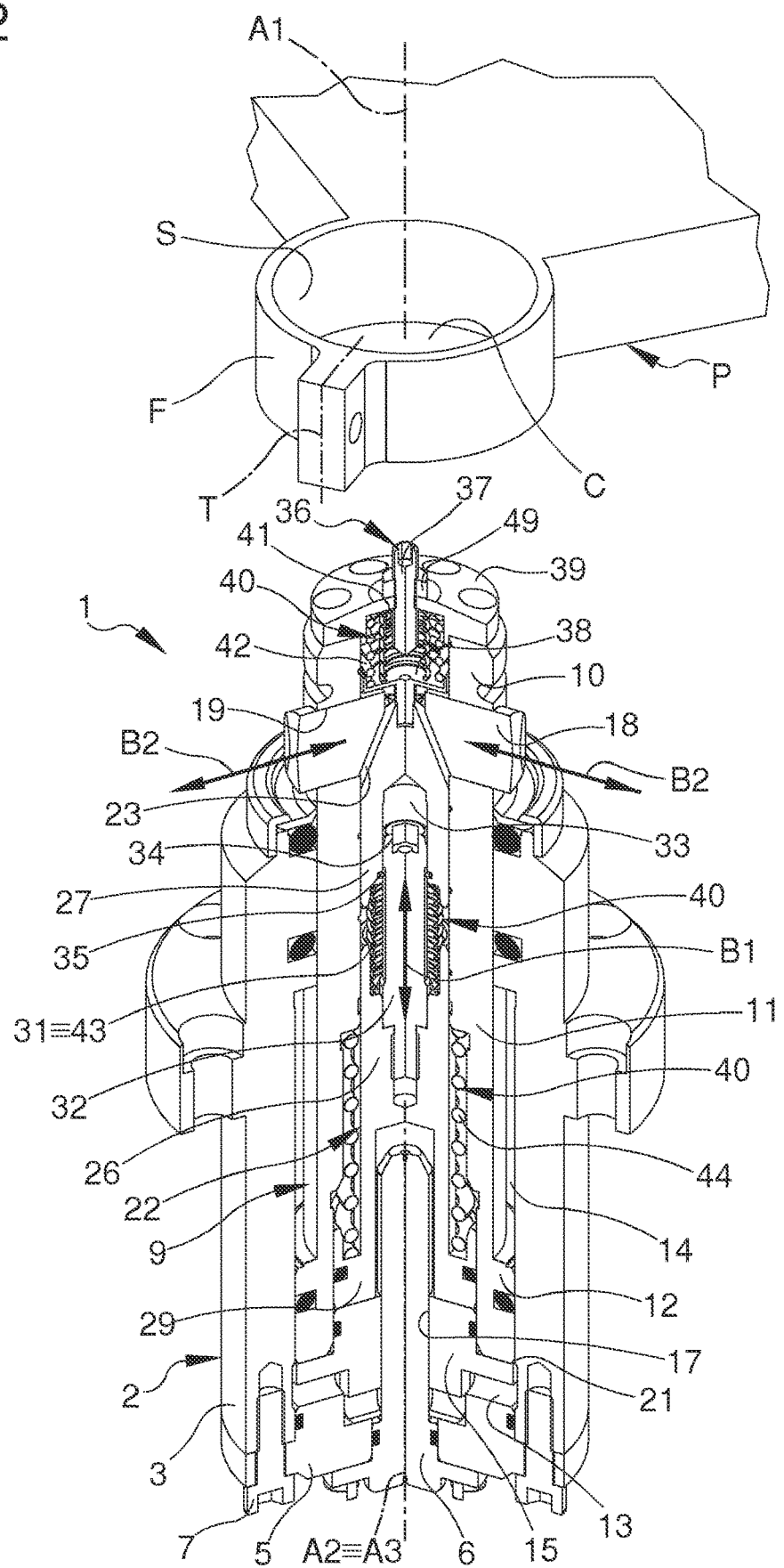
FIG. 2 is a partially split axonometric view of the device according to the invention.

With particular reference to these illustrations, reference numeral 1 globally indicates a device for restraining/locking mechanical parts on machine tools.

The device 1 is intended to lock a mechanical part P to be machined on a machine tool M, wherein the mechanical part P has at least one cavity C which is provided with an axis of cavity A1 and which consists e.g. of a groove, a through hole or other seat.

The cavity C has a substantially axial-symmetrical shape, e.g. cylindrical, and the axis of cavity A1 coincides with the geometric axis of the cavity C.

In the embodiment shown in FIGS. 2-5, e.g., the mechanical piece P consists of a workpiece fitted with a hose clamp F which has a central hole defining the cavity C.

The device 1 comprises at least one hydraulic cylinder 2 which can be fixed to the machine tool M, e.g. to a work surface L, to the bedplate or to any other part of it.

The hydraulic cylinder 2 has a central axis A2 which, in use, is intended to be placed substantially coincident with the axis of cavity A1.

In other words, the mechanical part P is mounted on the machine tool M in a pre-established position so that the axis of cavity A1 and the central axis A2 coincide.

The hydraulic cylinder 2 is defined, e.g., by a lateral liner 3, provided with a passage opening 4, by a bottom 5, closing at least partly the end of the lateral liner 3 opposite the passage opening 4, and by a pin element 6, extending from the bottom 5 inside the lateral liner 3 towards the passage opening 4.

The bottom 5 is associated with the lateral liner 3 by means of a first group of threaded connection members 7 (screws) while the pin element 6 is associated with the bottom 5 by means of a second group of threaded connection members 8.

Alternative embodiment cannot however be ruled out wherein the bottom 5 and the pin element 6 are made in a single body piece.

In the particular embodiment shown in FIGS. 2-5, the central axis A2 is arranged substantially vertically, with the mechanical piece P placed above the hydraulic cylinder 2, the passage opening 4 placed on top of the hydraulic cylinder 2 and the bottom 5 placed at the base of the hydraulic cylinder 2.

For the sake of simplicity in the presentation, in the remainder of the present treatise reference will be made to the arrangement of the device 1 shown in the figures and, therefore, words such as "upper", "lower", "above", "below", "to lift" "to lower" and the like will be understood with reference to what is shown in the figures.

It is easy to understand, however, that the device 1 can be fixed to the machine tool M with the central axis A2 oriented differently (e.g. horizontally or obliquely), depending on how the cavity C and the relevant axis of cavity A1 are arranged.

The hydraulic cylinder 2 contains a pressurised hydraulic fluid.

In the context of the present treatise, hydraulic fluid means any fluid in its liquid state (and therefore ideally incompressible) used as a carrier medium for the transport of energy in a hydraulic circuit; preferably the hydraulic fluid consists of a traditional synthetic oil but alternative embodiments cannot be ruled out wherein it may be mineral oil, vegetable oil, water or the like.

The device 1 comprises at least a first piston 9 inserted in the hydraulic cylinder 2 and comprising a head 10, which projects from the hydraulic cylinder 2.

Figure 3:
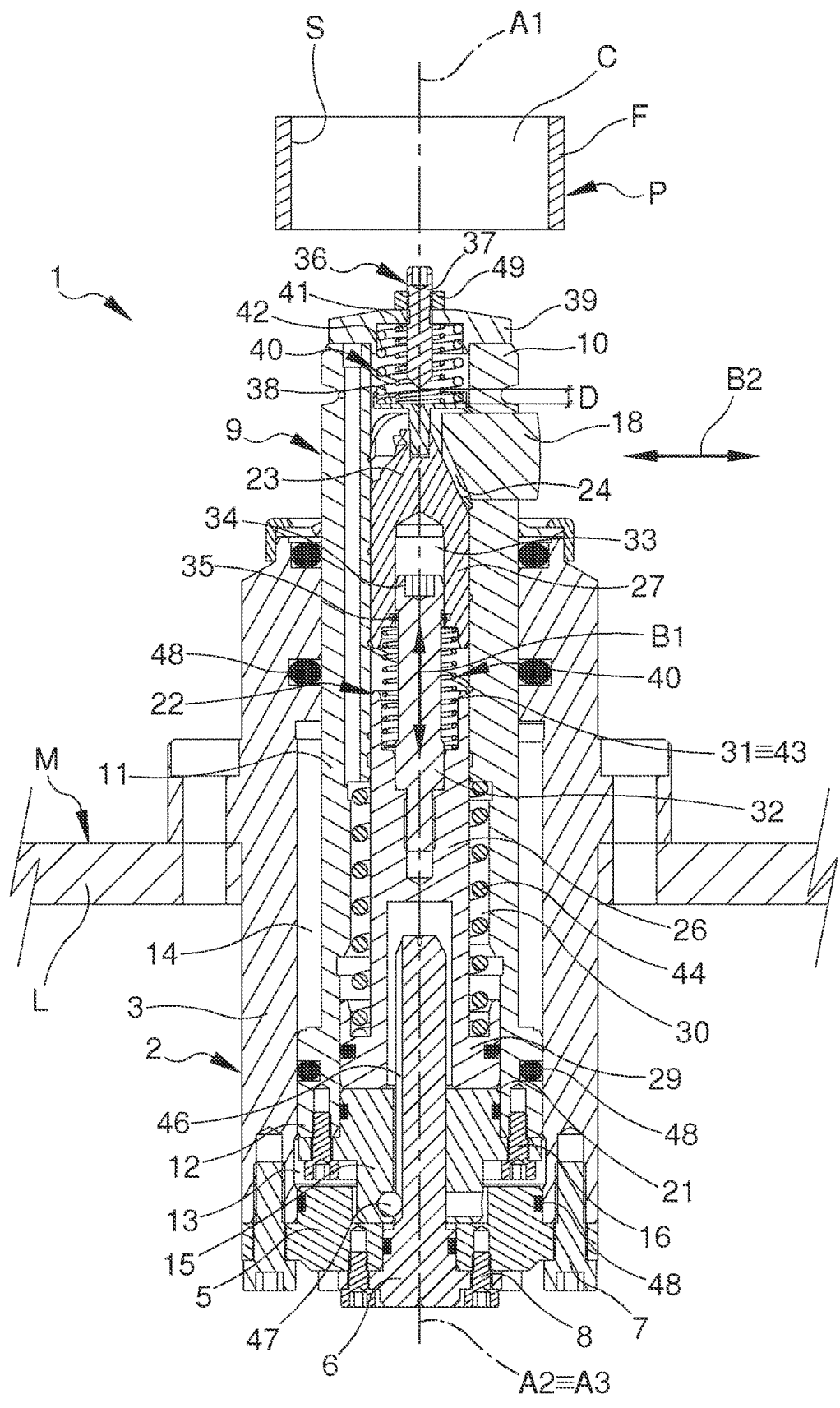
FIG. 3 is a cross-sectional view of the device according to the invention, wherein the first piston is in the home configuration.
Figure 4:
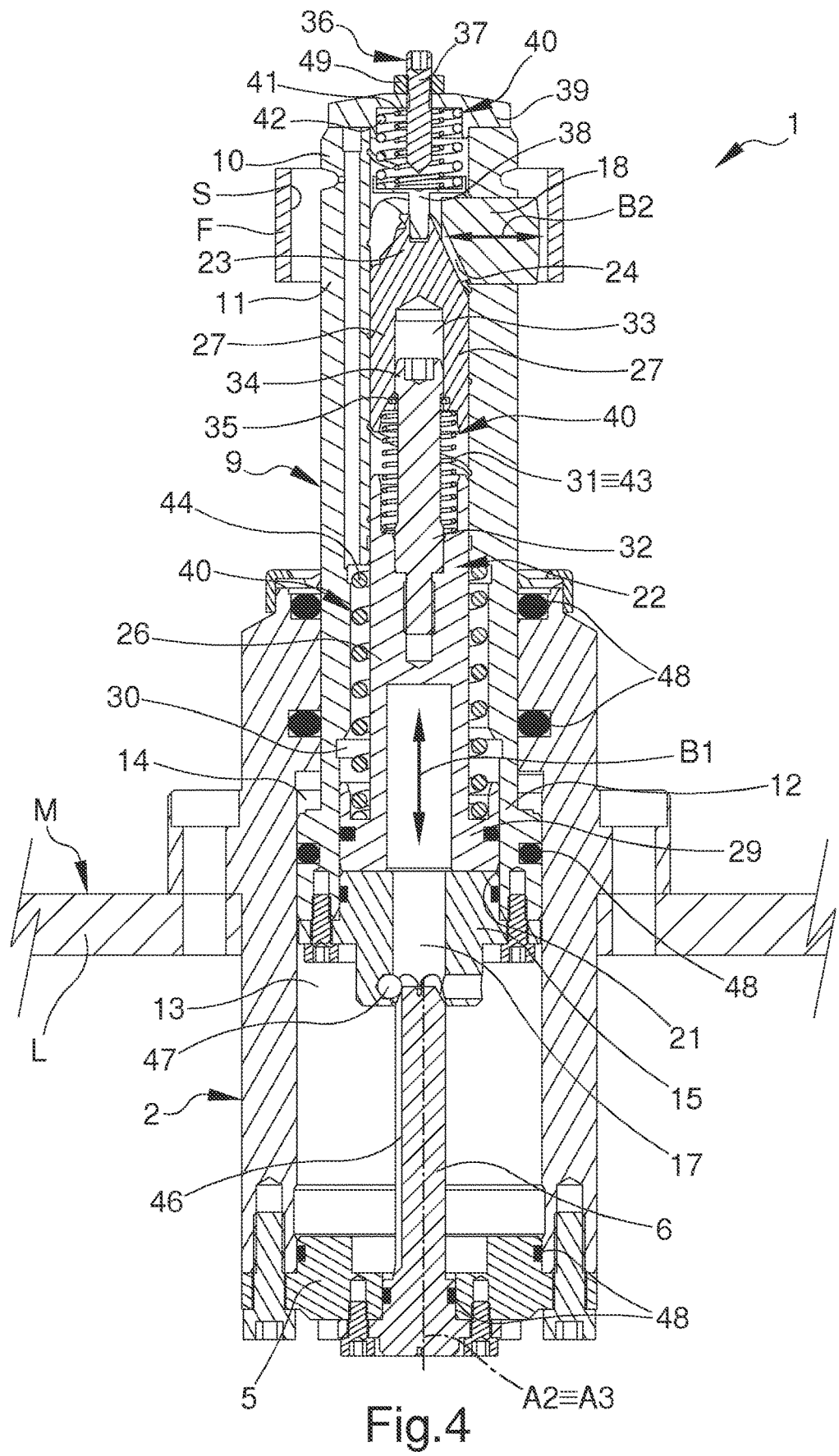
FIG. 4 is a cross-sectional view of the device according to the invention, wherein the first piston is in the operating configuration and the self-centring locking elements are in the retracted position.
Figure 5:
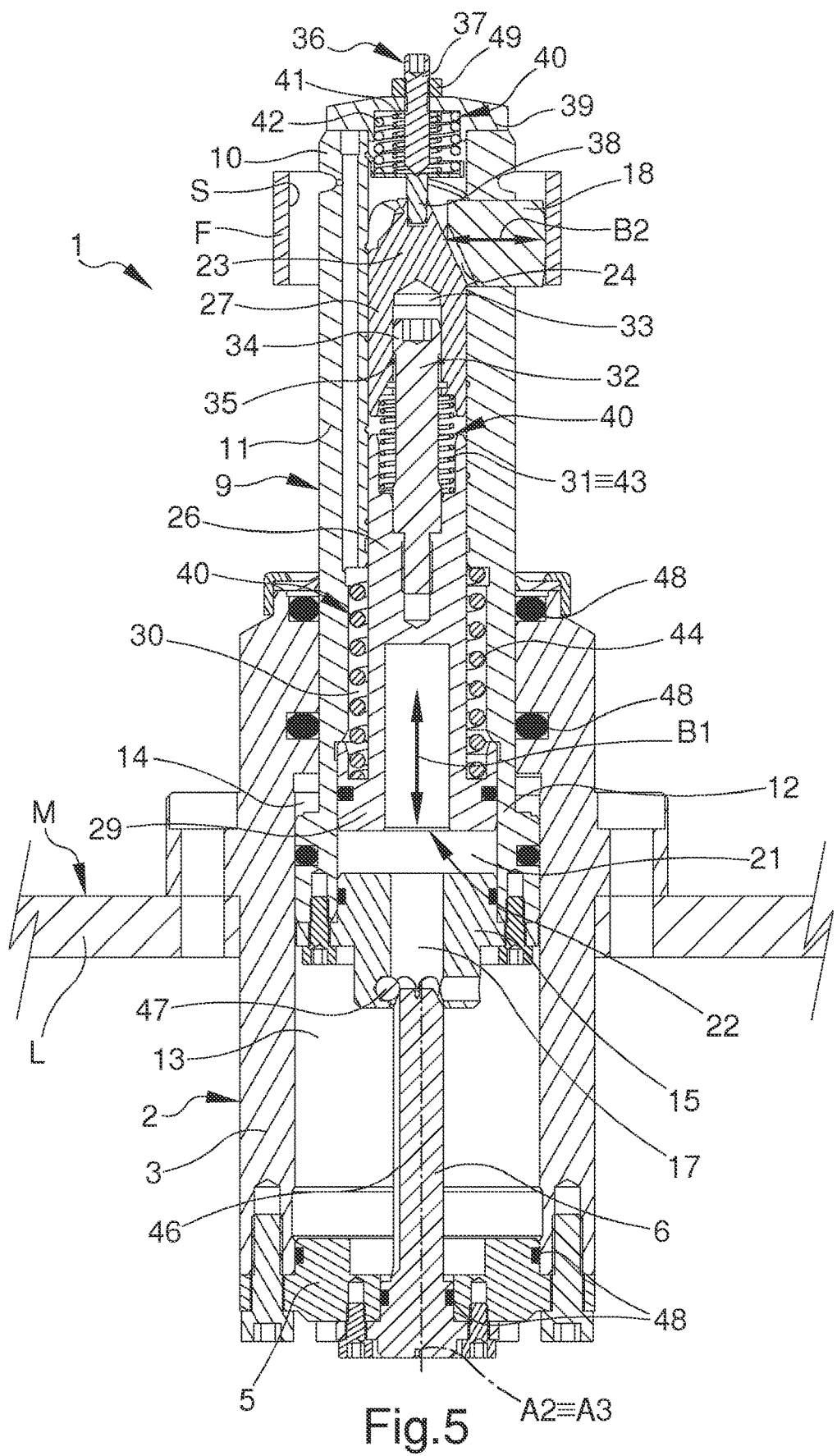
FIG. 5 is a cross-sectional view of the device according to the invention, wherein the first piston is in the operating configuration and the self-centring locking elements are in the extraction position.

The first piston 9 slides relative to the hydraulic cylinder 2 due to the thrust of the pressurised hydraulic fluid along a main line B1 between a home configuration, in which the head 10 is located outside the cavity C of the mechanical part P to be machined (FIGS. 2 and 3), and an operating configuration, in which the head 10 is located inside the cavity C (FIGS. 4 and 5).

More specifically, the first piston 9 consists advantageously of a stem 11 which extends along one axis of the stem A3 passing through the passage opening 4. The stem 11 has an external portion to the hydraulic cylinder 2, defining the head 10, and an internal portion to the hydraulic cylinder 2, defining an actuating piston 12, i.e. a part with an enlarged section that slides to measure on the internal walls of the hydraulic cylinder 2 and divides it into two opposite chambers.

Between the hydraulic cylinder 2 and the first piston 9, in fact, are defined:
at least a first chamber 13 that can be supplied with the pressurised hydraulic fluid to displace the first piston 9 from the home configuration to the operating configuration;
at least a second chamber 14 that can be supplied with the pressurised hydraulic fluid to displace the first piston 9 from the operating configuration to the home configuration.

In other words, the hydraulic cylinder 2 and the first piston 9 have a double acting operation for the back movement and hydraulic extraction of the first piston 9.

It is easy to understand, however, that alternative embodiments can be envisaged in which only one of the two chambers 13, 14 is provided for, in which case the hydraulic cylinder 2 and the first piston 9 have a single acting operation.

To supply the pressurised hydraulic fluid inside the first chamber 13 and the second chamber 14, the hydraulic cylinder 2 comprises internal ducts, not illustrated in the figures, which can be connected to a pumping hydraulic circuit, also not shown.

The axis of the stem A3 coincides with the central axis A2 of the hydraulic cylinder 2 and the main line B1 along which the first piston 9 runs is parallel to the central axis A2 and to the axis of the stem A3.

Conveniently, the ending part of the stem 11 inside the hydraulic cylinder 2, i.e. the part in the proximity of the actuating piston 12, is associated with a bottom cap 15.

The bottom cap 15 is preferably connected to the stem 11 by means of a group of threaded elements 16 (screws), but other types of connection cannot be ruled out.

On the bottom cap 15 is a through hole 17 that couples with the pin element 6.

Both the pin element 6 and the through hole 17 extend along the central axis A2 and the axis of the stem A3 which, as said, coincide with each other, and during the movement of the first piston 9 along the main line B1, the pin element 6 remains always inserted at least partly in the through hole 17.

In addition, the device 1 comprises at least two self-centring locking elements 18 which are associated with the head 10 in a movable manner along sliding lines B2 which are substantially transversal to the main line B1 for abutting an inner surface S of the cavity C when the first piston 9 is in the operating configuration.

The self-centring locking elements 18 consist, e.g., of a series of elongated pins extending along the respective sliding lines B2 and are inserted smoothly into the corresponding housing seats 18 obtained passing through the head 10.

In the particular embodiment shown in the figures, the self-centring locking elements 18 are three in number and lie, staggered by 120° from each other, on the same plane orthogonal to the main line B1; different solutions cannot however be ruled out provided with a different number of self-centring locking elements 18.

The device 1 also comprises movement means 21, 22 adapted to displace the self-centring locking elements 18 between a retracted position, wherein the self-centring locking elements 18 are substantially retracted inside the head 10, and an extracted position, wherein the self-centring locking elements 18 protrude from the head 10 and abut the inner surface S of the cavity C.

The movement means 21, 22 comprise:
- at least one hydraulic chamber 21 made inside the first piston 9; and
- at least a second piston 22 which is inserted inside the hydraulic chamber 21.

Advantageously, the hydraulic chamber 21 is defined in the lower part of the first piston 9 and is delimited by an inner side wall of the stem 11 and by the bottom cap 15.

The presence of the through hole 17 in the bottom cap 15 allows the hydraulic fluid to flow from the first chamber 13 to the hydraulic chamber 21, and vice versa.

The second piston 22 slides relative to the first piston 9 along the main line B1 due to the thrust of the pressurised hydraulic fluid between a starting position, corresponding to the retracted position of the self-centring locking elements 18, and an arrival position, corresponding to the extracted position of the self-centring locking elements 18.

The second piston 22 also comprises an operating portion 23 associated with the self-centring locking elements 18 and adapted to convert the motion of the second piston 22 along the main line B1 into the motion of the self-centring locking elements 18 along the lines of sliding B2.

For example, the operating portion 23 consists of a wedge-shaped end to be wedged on corresponding inclined surfaces 24 of the self-centring locking elements 18, which allow converting the motion from the main line B1 to the lines of sliding B2.

On the wedge-shaped end and on the corresponding inclined surfaces, dovetail guides 25 are usefully obtained, which allow the self-centring locking elements 18 to be pushed either in one line of the lines of sliding B2 or in the opposite line.

In the particular embodiment shown in the figures, the second piston 22 comprises:
- at least a first body 26 inserted in the hydraulic chamber 21 and adapted to receive the thrust of the hydraulic fluid;
- at least a second body 27 comprising the operating portion 23; and
- at least one elastic connection unit 31, 32 connecting the first body 26 and the second body 27, the mutual distance between the first body 26 and the second body 27 being variable.

The first body 26 is located below the elastic connection unit 31, 32, which in turn is located below the second body 27.

The first body 26, in practice, has a top that faces the second body 27 and a base that defines a thrust piston 29, that is, a part with an enlarged section that slides to measure on the inner walls of the hydraulic chamber 21.

The first body 26 and the hydraulic chamber 21 have a single acting operation and, in fact, only the lower surface of the first body 26 is wetted by the hydraulic fluid.

The second body 27 and the elastic connection unit 31, 32 which, as mentioned above, are arranged on top of the first body 26, are housed inside a pneumatic chamber 30 which is separated from the hydraulic chamber 21 by means of the thrust piston 29.

Pneumatic chamber 30 means a seat of the first piston 9 which is not accessible to the hydraulic fluid and is filled with air.

The second body 27 is inserted in a sliding manner into the pneumatic chamber 30 and has a base, facing the first body 26, and a top, which defines the operating portion 23 described above.

More in detail, the second body 27 is inserted in the stem 11 with a small diametrical clearance, as well as a small clearance is also provided at the coupling point between the operating portion 23 and the self-centring locking elements 18 (i.e. at the dovetail guides 25).

The above clearances allow the self-centring locking elements 18 to adapt to the shape of cavity C even when the axis of cavity A1 and the central axis A2 are not perfectly aligned, without transmitting unwanted deforming forces to the cavity C.

Between the top of the first body 26 and the base of the second body 27 is the elastic connection unit 31, 32.

The elastic connection unit 31, 32 comprises, e.g., a cushioning helical spring 31, which has an end stopping against the top of the first body 26 and an opposite end stopping against the base of the second body 27.

The elastic connection unit 31, 32 also usefully comprises an anti-distancing pin 32 which is placed between the first body 26 and the second body 27 in order to prevent the mutual away movement between the first body 26 and the second body 27 beyond a predetermined distance.

More in detail, the anti-distancing pin 32 is firmly fixed (e.g. by screwing) to the first body 26 and is inserted into a groove 33 obtained in the second body 27.

The portion of the anti-distancing pin 32 located inside the groove 33 has a pad 34 that rests against a narrowing 35 of the groove 33, defined e.g. by a seeger ring.

Narrowing 35 actually prevents the pad 34 from escaping from the groove 33 and, therefore, from moving the first body 26 away from the second body 27 beyond the predetermined distance.

The elastic connection unit 31, 32, in practice, acts as a shock absorber of the forces transmitted between the first body 26 and the second body 27, determines the force that the thrust piston 29 transmits to the operating portion 23 (and therefore to the self-centring locking elements 18) and prevents sudden pressure peaks in the hydraulic fluid from discharging directly onto the self-centring locking elements 18.

Alternative embodiments cannot however be ruled out wherein the first body 26 and the second body 27 are mutually locked together (e.g., because they are made of a single monolithic body) and the elastic connection unit 31, 32 is not provided for.

Advantageously, the device 1 comprises adjusting means 36 for adjusting the extracted position of the self-centring locking elements 18.

In practice, the adjusting means 36 allow setting the maximum stroke that can be travelled by the self-centring locking elements 18, which in many cases must vary according to the diameter of the cavity C to be machined and must be conveniently limited in order to avoid excessive deformation of the hose clamp F at the time of cutting.

The adjusting means 36, e.g., comprise at least one contact member 37 associated with the first piston 9 in a position that can be modified by an operator and adapted to come into contact with a contact surface 38 of the second piston 22 in the arrival position, to define an end-of-stroke of the sliding of the second piston 22 along the main line.

The contact member 37 comprises a threaded shank that can be screwed into the head 10 of the first piston 9 along a line substantially parallel to the main line B1.

More precisely, the head 10 comprises a head cap 39, which closes the upper part of the pneumatic chamber 30 and onto which the contact member 37 can be screwed, possibly by means of a tightening nut 49.

Preferably the head cap 39 is joined to the first piston 9 by means of a group of threaded elements (screws), not shown in the figures.

The contact surface 38, on the other hand, is defined, e.g., by a plate mounted at the upper end of the second piston 22.

When the first piston 9 is in the home configuration, by screwing and unscrewing the threaded shank it is possible to adjust the distance D between the contact member 37 and the contact surface 38 (FIG. 3), so as to define the maximum stroke that the second piston 22 can travel and therefore the maximum stroke that the self-centring locking elements 18 can travel.

The device 1 also comprises elastic return means 40 of the second piston 22 from the arrival position to the starting position.

The elastic return means 40 comprise, e.g., at least one detaching helical spring 41, 42 interposed between a surface of the head 10 and the contact surface 38.

In particular, the detaching helical spring 41, 42 is arranged at least in part around the contact member 37 and has an upper end stopping against the head cap 39 and a lower end stopping against the plate.

In the particular embodiment shown in the figures, the detaching helical springs 41, 42 are two in number, of which a first detaching helical spring 41 and a second detaching helical spring 42, with the first spring having a smaller diameter than the second one.

It is easy to understand, however, that alternative embodiments of the invention are possible wherein there is a different number of detaching helical springs 41, 42, e.g. only one, three or more.

Advantageously, the elastic return means 40 also comprise at least one compression helical spring 43 interposed between the first body 26 and the second body 27.

The compression helical spring 43, for example, coincides with the cushioning helical spring 31, which therefore has the dual aim of cushioning the force transmitted from the first body 26 to the second body 27 and of allowing the return of the second piston 22 from the arrival position to the starting position. Conveniently, the elastic return means 40 also comprise at least one return helical spring 44 interposed between the first body 26 and the first piston 9.

The return helical spring 44, for example, is located inside the pneumatic chamber 30 and has an upper end stopping against an inner shoulder of the first piston 9 and a lower end stopping against the thrust piston 29.

The detaching helical springs 41, 42, the compression helical spring 43 and the return helical spring 44 are precharged in order to exert a different spring force.

The return helical spring 44 exerts a lower force (e.g. 3 kg).

The detaching helical springs 41, 42 exert an intermediate force (e.g. 7 kg).

The compression helical spring 43 exerts the greatest force (e.g. 10 kg).

Advantageously, the device 1 also comprises anti-rotation means 46, 47 interposed between the hydraulic cylinder 2 and the first piston 9 adapted to prevent the rotation of the first piston 9 around the main line B1.

The anti-rotation means 46, 47 e.g. comprise:
  at least one channel 46 which is made on at least one of either the hydraulic cylinder 2 or the first piston 9 and extends along a substantially straight line parallel to the main line B1; and
  at least one engagement element 47 mounted on the other of either the hydraulic cylinder 2 or the first piston 9 and slidably inserted in the channel 46.

In the particular embodiment of the invention shown in the figures, the channel 46 is advantageously formed on the external surface of the pin element 6 while the engagement element 47, which e.g. consists of a ball, is mounted on the bottom cap 15 so as to protrude inside the through hole 17 and engage the channel 46.

Even more in detail, in the particular embodiment of the invention shown in the illustrations, the anti-rotation means 46, 47 comprise three channels 46, staggered by 120° around the central axis A2, and three engagement elements 47, mounted inside the through hole 17 with similar staggering by 120° around the axis of the stem A3, so as to ensure greater stability and precision during the start-up of the first piston 9.

The presence of the anti-rotation means 46, 47 allows keeping the self-centring locking elements 18 and the relative lines of sliding B2 always oriented in a pre-established way, so that the locking of the mechanical piece P takes place in pre-established positions.

The coupling between the self-centring locking elements 18 and the second body 27 also prevents the second body 27 from rotating around the main line B1.

It should be noted, however, that the first body 26 has no system that prevents the rotation around the main line B1, but this does not constitute any limit because the first body 26 only transmits forces and movement along the main line B1.

Both the first piston 9 and the second piston 22, as mentioned above, are mobile due to the effect of the hydraulic fluid; among the various parts of the device 1 that come into contact with the hydraulic fluid are therefore provided special gaskets 48, shown by simplicity only in FIGS. 3-5.

The operation of the present invention is as follows.

The mechanical part P is placed on the machine tool M with the first piston 9 arranged in the home configuration and the axis of cavity A1 substantially coinciding with the central axis A2.

The first piston 9 is then aligned with the cavity C but lowered and, therefore, the head 10 is placed outside the cavity C.

In this configuration, the machine tool M can perform a first sequence of machining operations on the mechanical part P which, e.g., may consist in grinding the internal surface S of the cavity C, in particular in the case where the mechanical part P, before reaching the machine tool M, has been obtained by casting, molding or similar techniques and, therefore, has irregular surfaces and contours.

Another example of possible machining operation that the machine tool M can perform as long as the first piston 9 remains in the home configuration is to drill the cavity C.

In this regard, it should be noted that when loading the mechanical part P onto the machine tool M, the cavity C may not yet be present on the mechanical part P and may be used for drilling, milling or other mechanical machining during the execution of the first sequence of machining operations.

At the end of the first sequence of machining operations, the cavity C has a perfectly machined internal surface S and the first piston 9 is still in the home configuration (FIG. 3).

Following the supply of the pressurised hydraulic fluid inside the first chamber 13, the actuating piston 12 is pushed upwards and with it also the rest of the first piston 9, so as to insert the head 10 inside the cavity C and reach the operating configuration (FIG. 4).

During the lifting of the first piston 9 the self-centring locking elements 18 remain in the retracted position; the hydraulic fluid, in fact, completely fills the first chamber 13 before starting to move to the hydraulic chamber 21 and to act on the second piston 22.

Once the operating configuration has been reached, the hydraulic fluid entering the hydraulic chamber 21 pushes the second piston 22 from the starting position to the arrival position.

The upward movement of the second piston 22 causes the operating portion 23 to shift the self-centring locking elements 18 along the corresponding lines of sliding B2, moving from the retracted position to the extracted position wherein the cavity C of the mechanical piece P is locked (FIG. 5).

In this position the machine tool M can perform a second sequence of machining operations on the mechanical part P which, e.g., may consist in cutting the hose clamp F by means of a cutting disc, not shown in the figures. The cut can for example be made on a cutting plane T shown in FIG. 2.

The locking of the hose clamp F by the self-centring locking elements 18 allows the cutting disc to perform the cutting operation with the mechanical part P perfectly immobilized, without the risk that the vibrations generated by the cut could compromise the correct execution of the operation and cause the breaking of the cutting disc.

Once the second machining sequence is complete, the device 1 returns to its initial configuration.

For this purpose, the first chamber 13 is connected in a fluid-operated manner to an outlet so as to reduce the pressure in the first chamber 13 and in the hydraulic chamber 21.

In the absence of a pressurised fluid inside the hydraulic chamber 21, the elastic return means 40 push the second piston 22 from the arrival position to the starting position, simultaneously determining the return of the self-centring locking elements 18 from the extracted position to the retracted position, thus releasing the cavity C.

At this point the pressurised hydraulic fluid is fed into the second chamber 14, thus causing the return of the first piston 9 from the operating configuration to the home configuration.

In practice, it has been found that the described invention achieves the intended objects.

In this regard, it should be noted that the special feature of providing a first piston that can be lifted and lowered allows the cavity to be left free during the first sequence of machining operations and to lock the mechanical part inside the cavity during the second sequence of machining operations.

This way, the mechanical part can be completely machined on the same machine tool and it is not necessary to machine it on a first station and a second station as is the case in the prior art.

It should also be noted that the special feature of providing for a first piston and a second piston moving one inside the other and both along the same main line allows obtaining a restraining/locking device of considerably reduced overall dimensions.

The invention claimed is:

1. A device (1) for restraining/locking mechanical parts on machines tools, wherein said device (1) comprises:
   at least one hydraulic cylinder (2) fixable to a machine tool (M);
   at least one first piston (9) inserted in said hydraulic cylinder (2) and comprising a head (10) which projects from said hydraulic cylinder (2), said first piston (9) being slidable relative to said hydraulic cylinder (2) due to the thrust of a pressurised hydraulic fluid along a main line (B1) between a home configuration, in which said head (10) is located outside a cavity (C) of a mechanical part (P) to be machined, and an operating configuration, in which said head (10) is located inside said cavity (C);
   at least two self-centring locking elements (18) joined to said head (10) in such a way that they are movable along lines of sliding (B2) which are substantially transversal to said main line (B1) for abutting an inner surface (S) of said cavity (C) when said first piston (9) is in said operating configuration; and
   movement means (21, 22) for moving said self-centring locking elements (18) between a retracted position and an extracted position, wherein said movement means (21, 22) comprise:
   at least one hydraulic chamber (21) made in said first piston (9);
   at least one second piston (22) which is inserted in said hydraulic chamber (21), which is slidable relative to said first piston (9) along said main line (B1) due to the thrust of said pressurised hydraulic fluid between a starting position, corresponding to said retracted position, and an arrival position, corresponding to said extracted position, and which comprises an operating portion (23) joined to said self-centring locking elements (18) and suitable for converting the motion of said second piston (22) along said main line (B1) into the motion of said self-centring locking elements (18) along said lines of sliding (B2).

2. The device (1) according to claim 1, wherein said device (1) comprises adjusting means (36) for adjusting said extracted position.

3. The device (1) according to claim 2, wherein said adjusting means (36) comprise at least one contact member (37) joined to said first piston (9) in a position modifiable by an operator and suitable for making contact with a contact surface (38) of said second piston (22) in said arrival position, for defining an end of stroke of the sliding of said second piston (22) along said main line (B1).

4. The device (1) according to claim 3, wherein said contact member (37) comprises a threaded shank which can be screwed into said head (10).

5. The device (1) according to claim 3, wherein said device (1) comprises elastic return means (40) for said second piston (22) from said arrival position to said starting position and wherein said elastic return means (40) comprise at least one detaching helical spring (41, 42) interposed between a surface of said head (10) and said contact surface (38).

6. The device (1) according to claim 1, wherein said second piston (22) comprises:

at least one first body (26) inserted in said hydraulic chamber (21) and suitable for receiving the thrust of said hydraulic fluid;

at least one second body (27) comprising said operating portion (23);

at least one elastic connection unit (31, 32) connecting said first body (26) and said second body (27), the distance between said first body (26) and said second body (27) being variable.

7. The device (1) according to claim 6, wherein said device (1) comprises elastic return means (40) for said second piston (22) from said arrival position to said starting position and wherein said elastic return means (40) comprise at least one compression helical spring (43) interposed between said first body (26) and said second body (27).

8. The device (1) according to claim 6, wherein said device (1) comprises elastic return means (40) for said second piston (22) from said arrival position to said starting position and wherein said elastic return means (40) comprise at least one return helical spring (44) interposed between said first body (26) and said first piston (9).

9. The device (1) according to claim 1, wherein said device (1) comprises elastic return means (40) for said second piston (22) from said arrival position to said starting position.

10. The device (1) according to claim 1, wherein the following are defined between said hydraulic cylinder (2) and said first piston (9):

at least one first chamber (13) which can be fed with said pressurised hydraulic fluid for shifting said first piston (9) from said home configuration to said operating configuration;

at least one second chamber (14) which can be fed with said pressurised hydraulic fluid for shifting said first piston (9) from said operating configuration to said home configuration.

11. The device (1) according to claim 1, wherein said device (1) comprises anti-rotation means (46, 47) interposed between said hydraulic cylinder (2) and said first piston (9) which are suitable for preventing rotation of said first piston (9) about said main line (B1).

12. The device according to claim 11, wherein said anti-rotation means (46, 47) comprise:

at least one channel (46) which is made on at least one of either said hydraulic cylinder (2) or said first piston (9) and extends along a substantially straight line parallel to said main line (B1); and at least one engagement element (47) mounted on the other of either said hydraulic cylinder (2) or said first piston (9) and slidably inserted in said channel (46).

\* \* \* \* \*